US012795791B2

(12) United States Patent

Liu et al.

(10) Patent No.: US 12,795,791 B2
(45) Date of Patent: Nov. 10, 2026

(54) DISPLAY DEVICE AND BRIGHTNESS ADJUSTMENT METHOD THEREOF

(71) Applicant: Optoma Corporation, New Taipei City (TW)

(72) Inventors: Yi-Cheng Liu, New Taipei City (TW); Yen-Hsiang Hung, New Taipei City (TW); Cheng-Chien Ou, New Taipei City (TW)

(73) Assignee: Optoma Corporation, New Taipei City (TW)

( * ) Notice: Subject to any disclaimer, the term of this patent is extended or adjusted under 35 U.S.C. 154(b) by 16 days.

(21) Appl. No.: 18/820,292

(22) Filed: Aug. 30, 2024

(65) Prior Publication Data

US 2025/0113419 A1 Apr. 3, 2025

(30) Foreign Application Priority Data

Sep. 28, 2023 (CN) ........................ 202311271356.4

(51) Int. Cl.
*H05B 45/10* (2020.01)
*H05B 45/14* (2020.01)

(52) U.S. Cl.
CPC .................................... *H05B 45/14* (2020.01)

(58) Field of Classification Search
CPC . G09G 3/32; G09G 5/10; H05B 45/10; H05B 45/14; H10H 29/10
See application file for complete search history.

(56) References Cited

U.S. PATENT DOCUMENTS

| | | | | |
|---|---|---|---|---|
| 9,059,337 | B1 | 6/2015 | Robinson et al. | |
| 2009/0058322 | A1 * | 3/2009 | Toma ..................... | H05B 45/46 315/297 |
| 2020/0225277 | A1 | 7/2020 | Kuo et al. | |

FOREIGN PATENT DOCUMENTS

| | | | | |
|---|---|---|---|---|
| CN | 101582224 | | 11/2009 | |
| CN | 103680411 | | 3/2014 | |
| CN | 110164384 | A * | 8/2019 | ........... G09G 3/3291 |
| CN | 114283742 | | 4/2022 | |
| CN | 115938289 | | 4/2023 | |
| CN | 116209121 | | 6/2023 | |
| TW | 200919426 | | 5/2009 | |

* cited by examiner

*Primary Examiner* — Henry Luong
(74) *Attorney, Agent, or Firm* — JCIPRNET

(57) ABSTRACT

A display device and a brightness adjustment method thereof are provided. The display device includes multiple light panels and a control circuit. Each light panel includes multiple light-emitting diodes, a driving circuit, and a storage circuit. The driving circuit is used to drive the light-emitting diodes and detect a forward voltage value of at least one light-emitting diode among the light-emitting diodes as a forward voltage value of a corresponding light panel. When a target light panel is used to replace one of the light panels, the control circuit controls forward voltage values of the target light panel and the reference light panel to become consistent.

9 Claims, 9 Drawing Sheets

DISPLAY DEVICE AND BRIGHTNESS ADJUSTMENT METHOD THEREOF

CROSS-REFERENCE TO RELATED APPLICATION

This application claims the priority benefit of China application serial no. 202311271356.4, filed on Sep. 28, 2023. The entirety of the above-mentioned patent application is hereby incorporated by reference herein and made a part of this specification.

BACKGROUND

Technical Field

The disclosure relates to an electronic device, and in particular to a display device and a brightness adjustment method thereof.

Description of Related Art

Nowadays, light-emitting diode display devices have been widely used in application scenarios such as conferences, stages, commercial performances, advertising, and exhibitions. However, with long-term use or under different ambient temperatures, the light panels of the light-emitting diode display device may have light attenuation, causing the brightness of emitting light to deviate from the brightness set by the original factory. Although the issue of light attenuation may be solved by replacing a new light panel, the brightness value difference between the new light panel and other old light panels may cause the display quality of the image to deteriorate.

In the previous technology, a photosensitive instrument may be used to measure the brightness value of the light panel within a specific focusing distance, and the updated brightness value of the light panel may be adjusted according to the measurement results to solve the issue of brightness value difference. However, this method may be limited by the installation environment of the light-emitting diode display. For example, the light-emitting diode display is installed in a position where it is difficult for the photosensitive instrument to measure, making it impossible to calibrate the light panel. In addition, the high cost of photosensitive instruments may also increase the cost of calibration.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the disclosure was acknowledged by a person of ordinary skill in the art.

SUMMARY

The disclosure provides a display device and a brightness adjustment method thereof, which may improve the calibration convenience of the display device and reduce the cost of calibration.

Other objects and advantages of the disclosure may be further understood from the technical features disclosed in the disclosure.

In order to achieve one, part or all of the above objects or other objects, an embodiment of the disclosure provides a display device including multiple light panels and a control circuit. Each light panel includes multiple light-emitting diodes, multiple light-emitting diodes, a driving circuit, and a storage circuit. The driving circuit is used to drive the light-emitting diodes and detect a forward voltage value of at least one light-emitting diode among the light-emitting diodes as a forward voltage value of the corresponding light panel. The storage circuit stores the forward voltage value of the light emitting diode. The control circuit is electrically coupled to the light panels. The light panels include at least one reference light panel. When a target light panel replaces one of the light panels, the forward voltage values of the target light panel and the reference light panel become consistent.

In an embodiment of the disclosure, the control circuit controls the driving circuit of the target light panel to adjust a driving current of the target light panel according to the forward voltage value of the target light panel and the forward voltage value of the at least one reference light panel, so that the forward voltage values of the target light panel and the at least one reference light panel become consistent.

In an embodiment of the disclosure, the control circuit controls the driving circuit of the target light panel to adjust the driving current of the target light panel according to an average of forward voltage values of the reference light panels surrounding the target light panel.

In an embodiment of the disclosure, the storage circuit further stores an initial brightness value, an initial forward voltage value, a current forward voltage value, and multiple ratios of forward voltage value differences and brightness value differences corresponding to different durations of usage. The control circuit further calculates to obtain the brightness value difference of the at least one reference light pane according to the initial forward voltage value of the at least one reference light panel, the current forward voltage value, and the ratio of the forward voltage value difference and the brightness value difference corresponding to the current duration of usage of the at least one reference light panel, calculates to obtain the current brightness value of the at least one reference light panel according to the brightness value difference of the at least one reference light panel and the initial brightness value of the at least one reference light panel, and controls the driving circuit of the target light panel according to the current brightness value of the at least one reference light panel to adjust the driving current of the target light panel.

In an embodiment of the disclosure, the control circuit further performs an interpolation calculation according to the forward voltage value differences corresponding to different durations of usage of the at least one reference light panel stored in the storage circuit, and performs an interpolation calculation according to the brightness value differences corresponding to different duration of usage of the at least one reference light panel stored in the storage circuit to obtain the ratio of the forward voltage value difference and the brightness value difference corresponding to the current duration of usage of at least one reference light panel.

In an embodiment of the disclosure, the driving circuit includes a driver and multiple resistors. The resistors are respectively electrically coupled between the driver and corresponding light-emitting diode of the light-emitting diodes. The driver receives at least one feedback voltage value from at least one common contact between the resistors and the light-emitting diodes to detect the forward voltage value of the corresponding light-emitting diode among the light-emitting diodes.

In an embodiment of the disclosure, the storage circuit of each light panel further stores position information of the each light panel.

In an embodiment of the disclosure, the display device further includes multiple hub boards, respectively electrically coupled to the control circuit and corresponding light panels, and providing position information of the light panels to the control circuit.

In an embodiment of the disclosure, the at least one reference light panel is a light panel adjacent to the target light panel.

The disclosure further provides a brightness adjustment method of a display device.

The display device includes the light panels, and each light panel includes the light-emitting diodes. The brightness adjustment method for the display device includes the following steps: detecting the forward voltage value of at least one light-emitting diode of the at least one reference light panel among the light panels as the forward voltage value of the reference light panel; detecting the forward voltage value of at least one light-emitting diode in the target light panel as the forward voltage value of the target light panel; allowing forward voltage values of the target light panel and the reference light panel to become consistent in response to the target light panel replacing one of the light panels.

In an embodiment of the disclosure, the brightness adjustment method of the display device includes adjusting the driving current of the target light panel according to the forward voltage values of the target light panel and the forward voltage value of the at least one reference light panel, so that forward voltage values of the target light panel and the at least one reference light panel become consistent.

In an embodiment of the disclosure, the brightness adjustment method of the display device includes adjusting the driving current of the target light panel according to an average of forward voltage values of the reference light panels surrounding the target light panel.

In an embodiment of the disclosure, the brightness adjustment method of a display device includes the following steps: calculating to obtain the brightness value difference of the at least one reference light panel according to an initial forward voltage value of the at least one reference light panel, a current forward voltage value, and the ratio of the forward voltage value difference and the brightness value difference corresponding to the duration of usage of the at least one reference light panel; calculating to obtain the current brightness value of the at least one reference light panel according to the brightness value difference of the at least one reference light panel and the initial brightness value of the at least one reference light panel; and adjusting the driving current of the target light panel according to the current brightness value of the at least one reference light panel.

In an embodiment of the disclosure, the brightness adjustment method of the display device includes performing the interpolation calculation according to forward voltage value differences corresponding to different duration of usage of the at least one reference light panel, and performing the interpolation calculation according to the brightness value difference corresponding to different durations of usage of the at least one reference light panel to obtain the ratio of the forward voltage value difference and the brightness value difference corresponding to the current duration of usage of the at least one reference light panel.

In an embodiment of the disclosure, the at least one reference light panel is a light panel adjacent to the target light panel.

Based on the above, the driving circuit of the embodiment of the disclosure may detect the forward voltage value of the light-emitting diode, and the control circuit may adjust the forward voltage value of the target light panel according to the forward voltage value of the reference light panel, so that the forward voltage value of the target light panel is consistent with the forward voltage value of the reference light panel, thereby correcting the brightness of the target light panel and solving the issue of inconsistent brightness between the target light panel and other light panels. In this way, adjusting the forward voltage value of the target light panel according to the forward voltage value of the reference light panel may prevent the installation position of the display device from affecting the calibration of the target light panel, and does not require the purchase of additional photosensitive instruments, thereby improving the convenience of calibration of the display device and reducing the cost of calibration.

Other objectives, features and advantages of the disclosure will be further understood from the further technological features disclosed by the embodiments of the disclosure wherein there are shown and described preferred embodiments of this disclosure, simply by way of illustration of modes best suited to carry out the disclosure.

DESCRIPTION OF THE EMBODIMENTS

It is to be understood that other embodiment may be utilized and structural changes may be made without departing from the scope of the disclosure. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
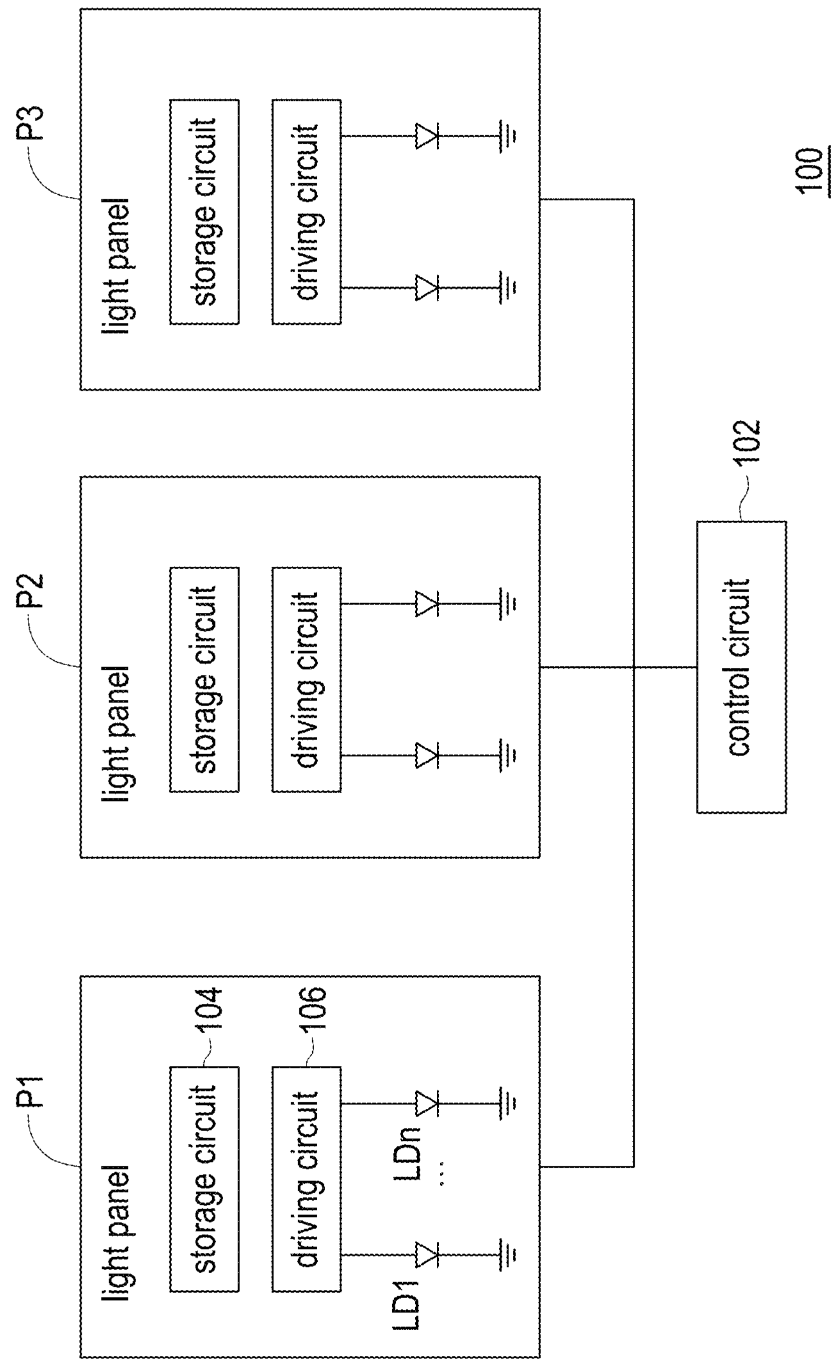
FIG. 1 is a schematic diagram of a display device according to an embodiment of the disclosure.

FIG. 1 is a schematic diagram of a display device according to an embodiment of the disclosure. Referring to FIG. 1, a display device 100 may include multiple light panels P1 to P3 and a control circuit 102. The light panels P1 to P3 are electrically coupled to the control circuit. 102. The light panels P1 to P3 may respectively include a storage circuit 104, a driving circuit 106, and multiple light-emitting diodes LD1 to LDn, where n is a positive integer. The control circuit 102 may be, for example, a micro control unit (MCU), but is not limited thereto. In addition, the number of the light panels is not limited to the three shown in FIG. 1.

Figure 2:
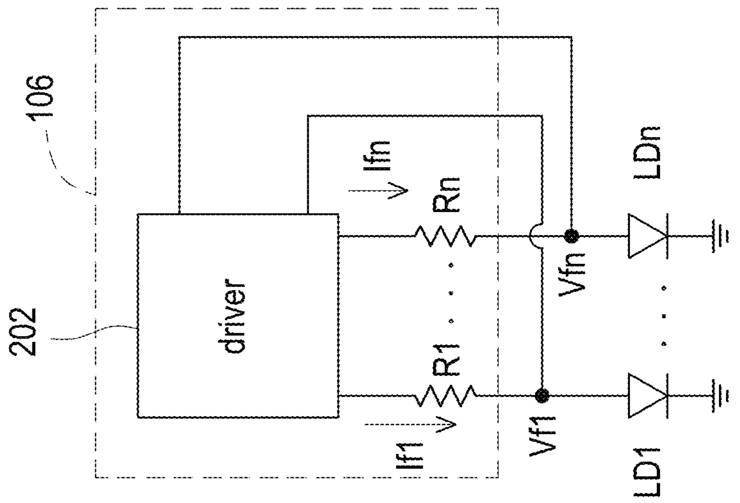
FIG. 2 is a schematic diagram of a driving circuit and a light-emitting diode according to an embodiment of the disclosure.

The driving circuit 106 may drive the light-emitting diodes LD1 to LDn, and detect a forward voltage value of at least one light-emitting diode among the light-emitting diodes LD1 to LDn as a forward voltage value corresponding to the light panel P1. By analogy, the driving circuit of the light panel P2 may detect the forward voltage value of the light-emitting diode thereof as the forward voltage value corresponding to the light panel P2, which is the same for the light panel P3, but is not limited thereto. FIG. 2 is a schematic diagram of a driving circuit and a light-emitting diode according to an embodiment of the disclosure. Furthermore, the driving circuit 106 may be as shown in FIG. 2, taking the light panel P1 as an example, including a driver 202 and resistors R1 to Rn, the resistors R1 to Rn are respectively electrically coupled to the driver 202 and the corresponding light-emitting diodes LD1 to LDn (for example, the resistor R1 is electrically coupled between the driver 202 and the light-emitting diode LD1). A common contact of the resistors R1 to Rn and the light-emitting diodes LD1 to LDn may be electrically coupled to a detection input terminal points of the driver 202. The driver 202 may provide driving currents If1 to Ifn to the light-emitting diodes LD1 to LDn to drive the light-emitting diodes LD1 to LDn to emit light. At the same time, the driver 202 may receive at least one feedback voltage value generated by the common contacts of the resistors R1 to Rn and the light-emitting diodes LD1 to LDn through the detection input terminal points (that is, forward voltage values Vf1 to Vfn of the light-emitting diodes LD1 to LDn), thereby knowing the forward voltage values Vf1 to Vfn of the light-emitting diodes LD1 to LDn. For example, the detection input terminal points of the driver 202 receive the feedback voltage value generated by the common contact points of the resistor R1 and the light-emitting diode LD1, where the at least one feedback voltage value represents the forward voltage value Vf1. The driver 202 may use at least one of the forward voltage values Vf1 to Vfn as the forward voltage value of the corresponding light panel (such as the light panel P1 in the example). In other embodiments, there may be only the common contacts of part of the resistors R1 to Rn and the light-emitting diodes LD1 to LDn connected to the detection input terminal points of the driver 202, such as the common contacts (corresponding to the forward voltage values Vf1, Vf2, and Vf3) of the resistors R1, R2, R3 (R2 and R3 not shown) of the resistors R1 to Rn and the light-emitting diodes LD1, LD2, LD3 (LD2 and LD3 not shown) of the light-emitting diodes LD1 to LDn are connected to the detection input terminal points of the driver 202 instead of all common contacts of the resistors R1 to Rn and the light emitting diodes LD1 to LDn being connected to the detection input terminal points of the driver 202.

Referring to FIG. 1 and FIG. 2, the storage circuit 104 may be used to store the forward voltage value and other correction parameters (such as an initial brightness value, an initial forward voltage value, etc. but not limited thereto) of the light-emitting diode detected by the driving circuit 106. The storage circuit 104 may store the forward voltage values of the light-emitting diodes thereof. In some embodiments, the control circuit 102 may use an average of the forward voltage values of the light-emitting diodes in a light panel as the forward voltage value of the light panel, but is not limited thereto. The control circuit 102 may also take the average of the forward voltage values of some light-emitting diodes as the forward voltage value of the light panel. For example, measuring pins are only set up in the middle or at four corners of the light panel to measure the average of the forward voltage values of the light-emitting diodes as the forward voltage value of the light panel. In this way, a circuit area may be saved. When a target light panel replaces one of the light panels P1 to P3, the control circuit 102 may use at least one of the unreplaced light panels as a reference light panel, and allow the forward voltage value of the target light panel and the reference light panel to become consistent (for example, the value difference between the forward voltage value of the target light panel and the forward voltage value of the reference light panel falls within a preset range), so that the target light panel and the reference light panel have the same or similar brightness, thereby solving the issue of inconsistent brightness between the target light panel and other light panels. The degree to which the forward voltage value of the target light panel approaches the forward voltage value of the reference light panel may be determined, for example, by a brightness value difference between the target light panel and the reference light panel. Since a normal human eye may not distinguish a level of brightness error within 3%, when the brightness value difference between the target light panel and the reference light panel is less than 3%, the forward voltage values of the target light panel and the reference light panel may be considered as consistent.

For example, assuming that the target light panel is used to replace the light panel P2, at least one of the light panels P1 and P3 may be used as a reference light panel. The control circuit 102 may, for example, use the light panel P1 as a reference light panel, and adjust the driving currents If1 to Ifn of the target light panel to allow the forward voltage value of the target light panel (that is, the forward voltage value Vf1 to Vfn of the light-emitting diodes LD1 to LDn in the target light panel) to become consistent with the forward voltage value of the light panel P1. For another example, the light panels P1 and P3 may be used as the reference light panels, and the driving currents If1 to Ifn of the target light panel may be adjusted to allow the forward voltage value of the target light panel to become consistent with an average value of the forward voltage values of the light panels P1 and P2.

Figure 3:
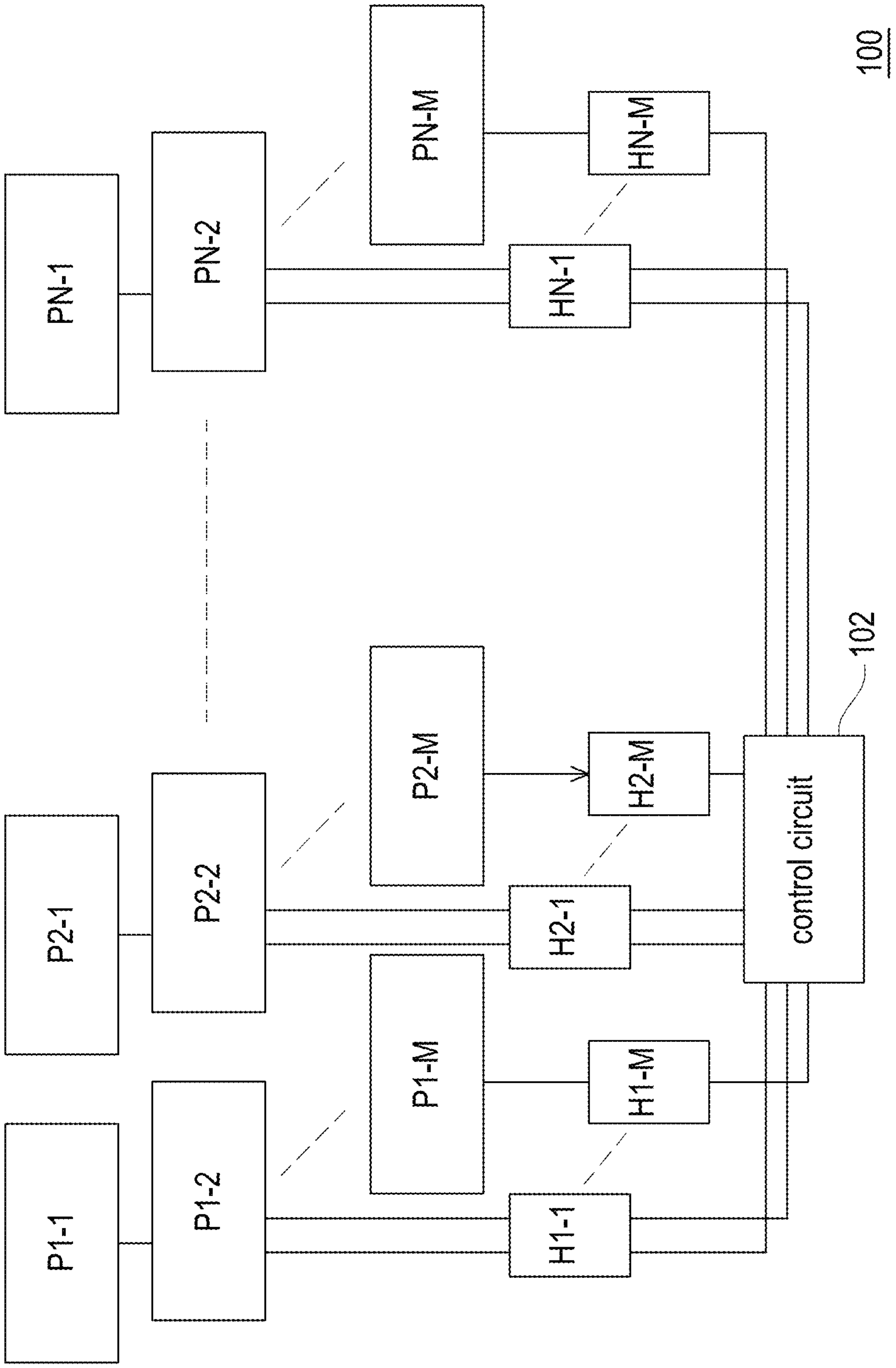
FIG. 3 is a schematic diagram of another display device according to an embodiment of the disclosure.

FIG. 3 is a schematic diagram of another display device according to an embodiment of the disclosure. The architecture of FIG. 3 is the same as that of FIG. 1. The only difference is that multiple hub boards and more light panels are present, which will be described in detail below. Referring to FIG. 1, FIG. 2 and the foregoing embodiments, the reference light panel may be, for example, a light panel adjacent to the replaced light panel. That is, a light panel adjacent to the target light panel. However, the disclosure is not limited thereto. For example, in the embodiment of FIG. 3, assuming that the target light panel is a light panel P2-2, the reference light panel may be, for example, a light panel P1-2 or a light panel P1-1, or three light panels including light panels P1-1, P1-2, and P2-1. When multiple light panels are used as the reference light panel, the driving current If1 to Ifn of the target light panel may be adjusted according to the average of the forward voltage values of the reference light panels, so that the forward voltage of the target light panel becomes consistent with the average of the forward voltage values of the reference light panels. In the embodiment of FIG. 3, the display device 100 may further include hub boards H1-1 to HN-M. The hub boards H1-1 to HN-M are electrically coupled to the corresponding light panels P1-1 to PN-M and the control circuit 102. N and M are positive integers. The hub boards H1-1 to HN-M may store a position information (such as a coordinate information) of the corresponding light panels P1-1 to PN-M to provide the position of the target light panel to the control circuit 102 when exchanging the target light panel. The hub boards H1-1 to HN-M may further provide the power required for the operation of the light panels P1-1 to PN-M. In other embodiments, the position information of the light panels P1-1 to PN-M may also be stored in the storage circuits 104 of the light panels P1-1 to PN-M.

In this way, the forward voltage value of the target light panel is adjusted according to the forward voltage value of the reference light panel to allow the forward voltage value of the target light panel to become consistent with the forward voltage value of the reference light panel. There is no need to purchase additional photosensitive instruments for calibration of brightness. The installation position of the display device may be prevent from affecting the calibration of the target light panel, effectively improving the convenience of calibration of the display device, thereby reducing the cost of calibration.

Figure 4:
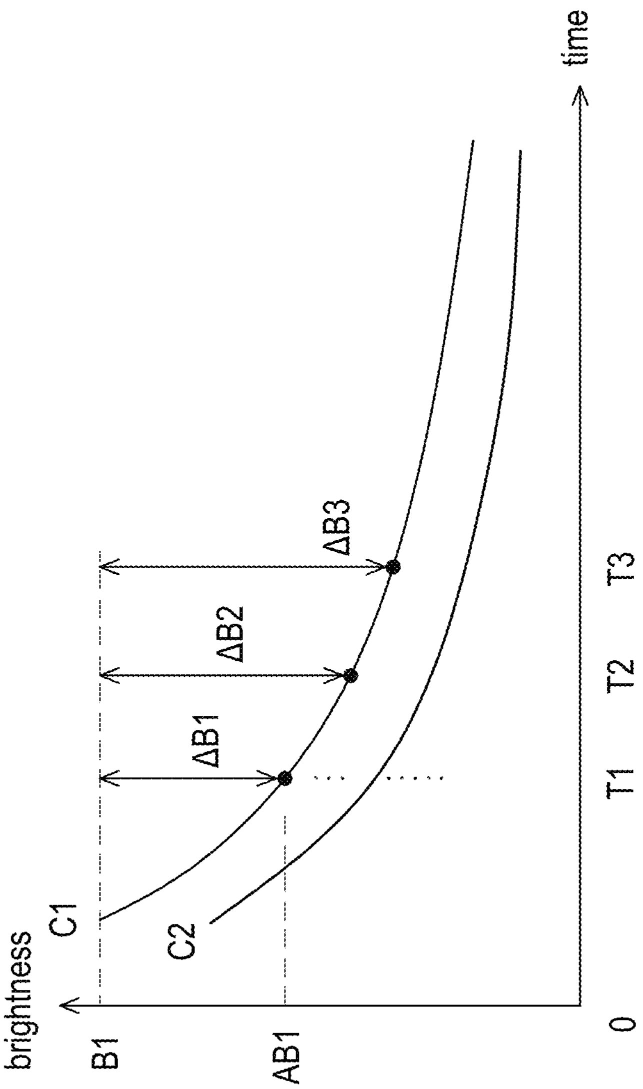
FIG. 4 is a schematic diagram of a brightness attenuation of a light-emitting diode according to an embodiment of the disclosure.
Figure 5:
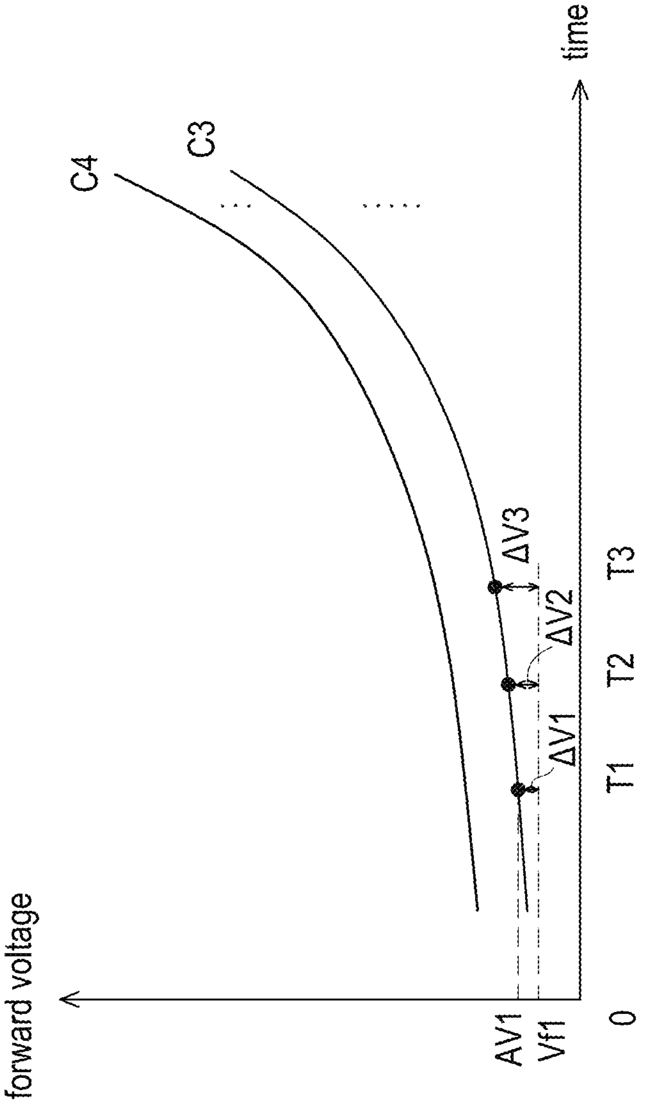
FIG. 5 is a schematic diagram of a forward voltage value shift of a light-emitting diode according to an embodiment of the disclosure.

FIG. 4 is a schematic diagram of a brightness attenuation of a light-emitting diode according to an embodiment of the disclosure. FIG. 5 is a schematic diagram of a forward voltage value shift of a light-emitting diode according to an embodiment of the disclosure. Specifically, the storage circuit 104 may store an initial brightness value, an initial forward voltage value, a current forward voltage value, and multiple ratios of a forward voltage value difference and a brightness value difference of the light panel corresponding to different durations of usage. For example, as shown in FIGS. 4 and 5, the storage circuit 104 may store ratios XT1, XT2, and XT3 of the forward voltage value differences and the brightness value differences corresponding to different durations of usage T1, T2, and T3 on the curves C1 and C3, in which XT1=ΔV1/ΔB1, X2=ΔV2/ΔB2, XT3=ΔV3/ΔB3. ΔV1, ΔV2, and ΔV3 are the forward voltage value differences corresponding to the time T1, T2, and T3. ΔB1, ΔB2, and ΔB3 are the brightness value differences of the light panels (the light-emitting diodes) corresponding to the time T1, T2, and T3. The time T1, T2, and T3 may be, for example, ¼, 2/4, or ¾ of the service life of the light panel. For example, in response to the service life of the light panel being 100,000 hours, the time T1, T2, and T3 may be 25,000 hours, 50,000 hours, and 75,000 hours respectively. However, the disclosure is not limited thereto, which may also be an area with a gentle slope of the curve. For example, in the curve C1 in FIG. 4, the area with a relatively gentle slope is, for example, between 3000 hours and 11000 hours. Therefore, the time T1, T2, and T3 may be respectively, for example, that the time T1 is 6000 hours, the time T2 is 7000 hours, and the time T3 is 8000 hours. In areas with the relatively gentle slope, the brightness of the light panel does not change too drastically even at different temperatures. In some embodiments, when using the ratios XT1, XT2 and XT3, the time points T1, T2, and T3 used are not necessarily the time points when the target light panel replaces the existing light panel. For example, the time point of the stored ratio is 25,000 hours, but the current reference light panel is used for 37,500 hours. In order to find out the ratio XT corresponding to the reference light panel at 37,500 hours, the data of the ratio XT1 (25,000 hours) and the ratio XT2 (50,000 hours) are used to perform interpolation calculations to find out the ratio XT corresponding to the reference light panel at 37,500 hours, thereby reducing the error.

The control circuit 102 may calculate to obtain the brightness of the reference light panel according to the initial forward voltage value V1 of the reference light panel, the current forward voltage value, and the ratio of the forward voltage value difference and the brightness value difference corresponding to the current duration of usage of the reference light panel, calculate to obtain the current brightness value of the reference light panel according to the brightness value difference of the reference light panel and an initial brightness value B1 of the reference light panel, and control the driving circuit 106 of the target light panel to adjust the driving current of the target light panel according to the current brightness value of the reference light panel. For example, assuming that the current duration of usage of the reference light panel is the time T1, since the initial forward voltage value V1 and the current forward voltage value are known (detected by the driving circuit 106), the forward voltage value difference ΔV1 may be known (the forward voltage value difference between the initial forward voltage value V1 and the current forward voltage value). The brightness value difference ΔB1 may be obtained by calculation by using the known ratio XT1. In addition, the current brightness value of the reference light panel may be obtained by calculation according to the brightness value difference ΔB1 and the known initial brightness value B1 of the reference light panel. After obtaining the current brightness value of the reference light panel, since the initial forward voltage value V1, the initial brightness value B1, and the changing relationship between the forward voltage value and the brightness value (that is, the ratio XT1) of the target light panel are also known, by applying the current brightness value of the reference light panel to the current brightness value of the target light panel (to allow the brightness values of the reference light panel and the target light panel to be consistent), the forward voltage value that the target light panel is to reach may be obtained. Therefore, the control circuit 102 may adjust the driving current of the target light panel to allow the forward voltage values of the target light panel and the reference light panel to become consistent, which is to allow the brightness of the target light panel and the reference light panel to become consistent.

Figure 6:
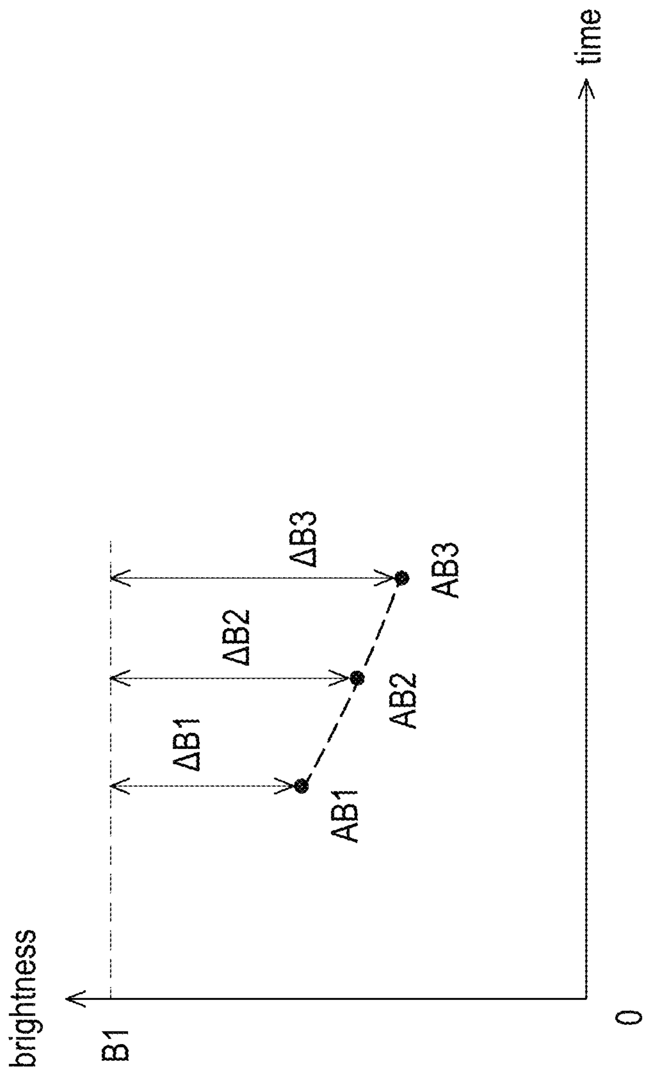
FIG. 6 is a schematic diagram of a brightness adjustment of a light-emitting diode according to an embodiment of the disclosure.
Figure 7:
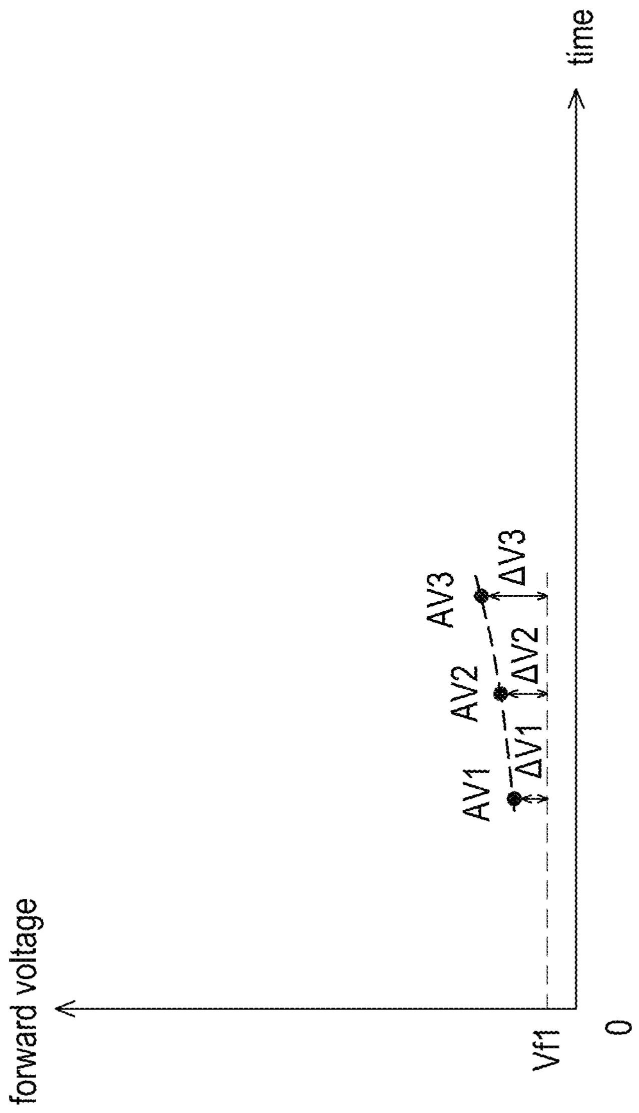
FIG. 7 is a schematic diagram of a forward voltage value adjustment of a light-emitting diode according to an embodiment of the disclosure.

FIG. 6 is a schematic diagram of the brightness adjustment of a light-emitting diode according to an embodiment of the disclosure. FIG. 7 is a schematic diagram of a forward voltage value adjustment of a light-emitting diode according to an embodiment of the disclosure. As shown in FIGS. 6 and 7, the control circuit 102 may adjust the brightness value of the target light panel from the initial brightness value B1 to a brightness value ΔB1 that is the same as the reference light panel in FIG. 4 (taking the time of the reference light panel being T1 as an example) through adjusting the driving current of the target light panel (reduce the driving current of the target light panel to allow the brightness of the target light panel to be close to the brightness of the reference light panel). At this time, the forward voltage value of the target light panel is adjusted by the control circuit 102 from Vf1 to become consistent with a forward voltage value AV1 of the reference light panel in FIG. 5 (taking the time of the reference light panel being T1 as an example). That is to say, in response to the forward voltage value difference ΔV1 (a forward voltage value deviation amount) of the target light panel in FIG. 7 being nearly consistent with the forward voltage value difference ΔV1 (the forward voltage value deviation amount) of the reference light panel in FIG. 5, the brightness of the target light panel and the reference light panel are also nearly consistent.

It is worth noting that the storage circuit 104 may also store the ratio of the forward voltage value difference and the brightness value difference corresponding to different duration of usage T1, T2, and T3 on the corresponding curves C2 and C4. The curves C1 and C3 are curves corresponding to the same ambient temperature, while the curves C2 and C4 are curves corresponding to another ambient temperature. The control circuit 102 may use the corresponding curves to adjust the driving current of the target light panel according to different ambient temperatures. As mentioned in the previous example, in response the current duration of usage of the reference light panel being not exactly the time T1, T2 or T3, the control circuit 102 performs an interpolation calculation (or an extrapolation calculation) according to the forward voltage value difference corresponding to the different duration of usage (for example, the time T1, T2, or T3) of the reference light panel stored in the storage circuit 104, and performs an interpolation calculation (or an extrapolation calculation) according to the brightness value difference corresponding to the different duration of usage of the corresponding reference light panel stored in the storage circuit 104 to obtain the ratio of the forward voltage value difference and the brightness value difference corresponding to the current duration of usage of the reference light panel, thereby adjusting the driving current of the target light panel in the manner described in the above embodiment. In addition, in some embodiments, the current forward voltage value of the reference light panel may also be, for example, the average of multiple reference light panels, and is not limited to the current forward voltage value of a single reference light panel.

Figure 8:
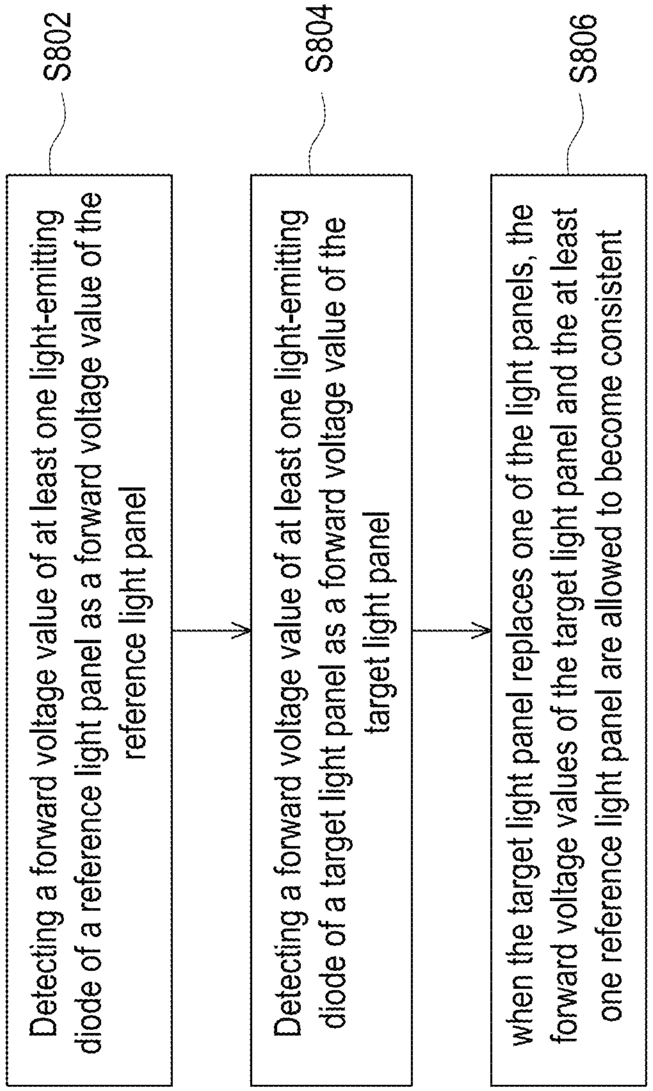
FIG. 8 is a flow chart of a brightness adjustment method of a display device according to an embodiment of the disclosure.

FIG. 8 is a flow chart of a brightness adjustment method of a display device according to an embodiment of the disclosure. Referring to FIG. 8, as may be seen from the above embodiments, the brightness adjustment method of the display device may include at least the following steps. First, the forward voltage value of at least one light-emitting diode of at least one reference light panel among the light panels is detected as the forward voltage value of the reference light panel (step S802). The reference light panel may be, for example, the light panel adjacent to the target light panel. Next, the forward voltage value of at least one light-emitting diode in the target light panel is detected as the forward voltage value of the target light panel (step S804). The target light panel is a new light panel used to replace the old light panel. Afterwards, when the target light panel replaces one of the light panels, the forward voltage values of the target light panel and the reference light panel are allowed to become consistent (step S806). For example, the driving current of the target light panel may be adjusted according to the forward voltage value of the reference light panel and the forward voltage value of the target light panel, so that the forward voltage values of the target light panel and the reference light panel become consistent in response to the target light panel replacing one of the light panels. There may be one or more reference light panels used to adjust the driving current. For example, the driving current of the target light panel may be adjusted according to the average of the forward voltage values of the reference light panels surrounding the target light panel.

Figure 9:
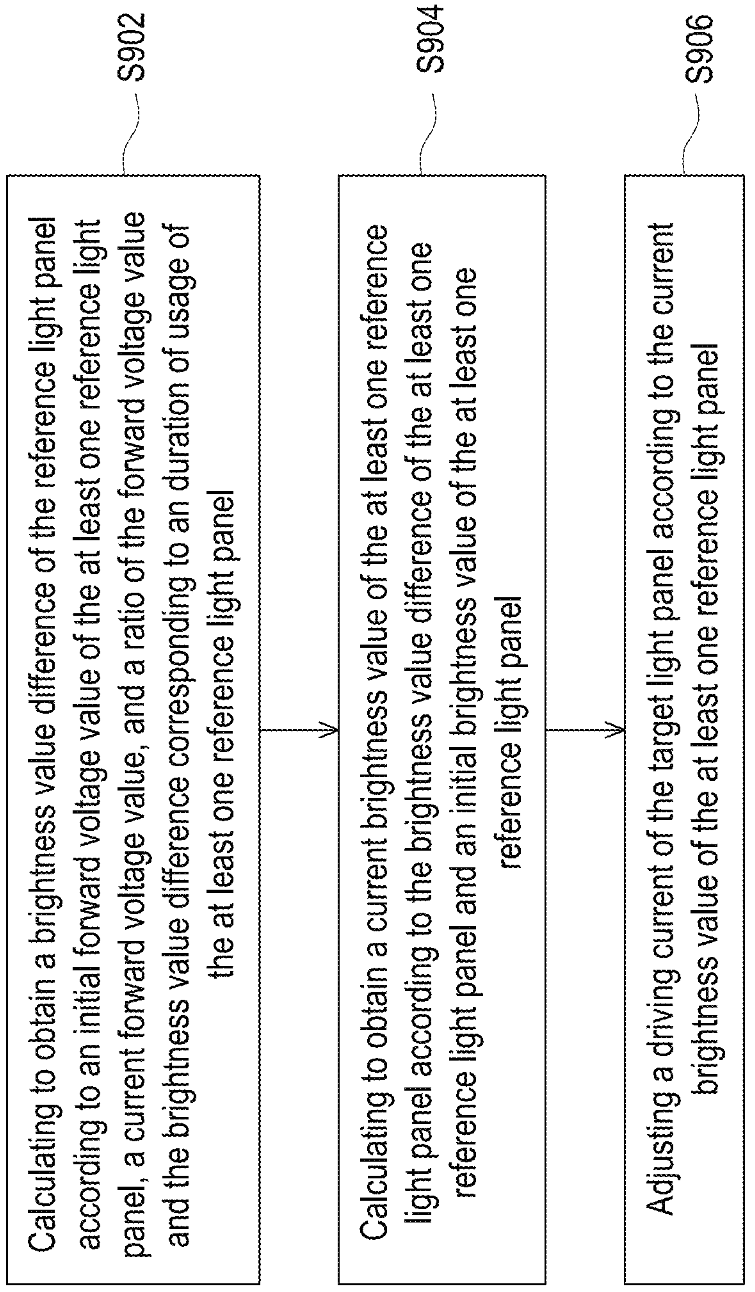
FIG. 9 is a flow chart of an adjustment method of a forward voltage value of a target light panel according to an embodiment of the disclosure

Furthermore, the method of adjusting the driving current of the target light panel may be shown in FIG. 9. First, the brightness value difference of the reference light panel is obtained by calculation according to the initial forward voltage value of the at least one reference light panel, the current forward voltage value, and the ratio of the forward voltage value and the brightness value difference corresponding to the duration of usage of the at least one reference light panel (step S902). In some embodiments, in response to the duration of usage of the reference light panel being not exactly equal to the pre-stored duration of usage, the interpolation calculation or the extrapolation calculation may be performed according to the forward voltage value difference corresponding to the different durations of usage of the pre-stored reference light panel, and the interpolation calculation or the extrapolation calculation may be performed according to the brightness value difference corresponding to the different duration of usage of the reference light panel to obtain the ratio of the forward voltage value difference and the brightness value difference corresponding to the current duration of usage of the reference light panel. Next, the current brightness value of the reference light panel is obtained by calculation according to the brightness value difference of the reference light panel and the initial brightness value of the reference light panel (step S904). Afterwards, the driving current of the target light panel is adjusted according to the current brightness value of the reference light panel (step S906).

In summary, the driving circuit of the embodiment of the disclosure may detect the forward voltage value of the light-emitting diode, and the control circuit may adjust the forward voltage value of the target light panel according to the forward voltage value of the reference light panel, so that the forward voltage value of the target light panel becomes consistent with the forward voltage value of the reference light panel, thereby correcting the brightness of the target light panel and solving the issue of inconsistent brightness between the target light panel and other light panels. In this way, adjusting the forward voltage value of the target light panel according to the forward voltage value of the reference light panel may prevent the installation position of the display device from affecting the calibration of the target light panel, so that there is no need to purchase additional photosensitive instruments, thereby improving the convenience of calibration of the display device and reducing the cost of correction calibration.

The foregoing description of the preferred embodiments of the disclosure has been presented for purposes of illustration and description. It is not intended to be exhaustive or to limit the disclosure to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the disclosure and its best mode practical application, thereby to enable persons skilled in the art to understand the disclosure for various embodiments and with various modifications as are suited to the particular use or implementation contemplated. It is intended that the scope of the disclosure be defined by the claims appended hereto and their equivalents in which all terms are meant in their broadest reasonable sense unless otherwise indicated. Therefore, the term “the invention”, “the present invention” or the like does not necessarily limit the claim scope to a specific embodiment, and the reference to particularly preferred exemplary embodiments of the disclosure does not imply a limitation on the disclosure, and no such limitation is to be inferred. The disclosure is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the disclosure. It should be appreciated that variations may be made in the embodiments described by persons skilled in the art without departing from the scope of the disclosure as defined by the following claims. Moreover, no element and component in the present disclosure is intended to be dedicated to the public regardless of whether the element or component is explicitly recited in the following claims.

What is claimed is:

1. A display device, comprising:

a plurality of light panels, wherein each light panel comprises:

a plurality of light-emitting diodes;

a driving circuit, configured to drive the plurality light-emitting diodes and detect a forward voltage value of at least one light-emitting diode of the plurality light-emitting diodes as a forward voltage value corresponding to the light panel; and a storage circuit, configured to store the forward voltage value of the at least one light-emitting diode; and a control circuit, electrically coupled to the plurality of light panels, wherein the plurality of light panels comprises at least one reference light panel, wherein in response to a target light panel replacing one of the plurality of light panels, forward voltage values of the target light panel and the at least one reference light panel become consistent, wherein the control circuit is configured to control the driving circuit of the target light panel to adjust a driving current of the target light panel according to the forward voltage value of the target light panel and at least one forward voltage value of the at least one reference light panel, and wherein the control circuit is configured to control the driving circuit of the target light panel to adjust the driving current of the target light panel according to an average of forward voltage values of some of the plurality of reference light panel surrounding the target light panel.

2. A display device, comprising:

a plurality of light panels, wherein each light panel comprises:

a plurality of light-emitting diodes;

a driving circuit, configured to drive the plurality light-emitting diodes and detect a forward voltage value of at least one light-emitting diode of the plurality light-emitting diodes as a forward voltage value corresponding to the light panel; and a storage circuit, configured to store the forward voltage value of the at least one light-emitting diode; and a control circuit, electrically coupled to the plurality of light panels, wherein the plurality of light panels comprises at least one reference light panel, wherein in response to a target light panel replacing one of the plurality of light panels, forward voltage values of the target light panel and the at least one reference light panel become consistent, wherein the driving circuit comprises:

a driver; and a plurality of resistors, respectively electrically coupled between light-emitting diodes corresponding to the driver and corresponding light-emitting diodes of the plurality of light-emitting diodes, wherein the driver is configured to receive at least one feedback voltage value generated from at least one common contact between the plurality of resistors and the plurality of light-emitting diodes to detect a forward voltage value of the corresponding light-emitting diodes.

3. A display device, comprising:

a plurality of light panels, wherein each light panel comprises:

a plurality of light-emitting diodes;

a driving circuit, configured to drive the plurality light-emitting diodes and detect a forward voltage value of at least one light-emitting diode of the plurality light-emitting diodes as a forward voltage value corresponding to the light panel; and a storage circuit, configured to store the forward voltage value of the at least one light-emitting diode; and a control circuit, electrically coupled to the plurality of light panels, wherein the plurality of light panels comprises at least one reference light panel, wherein in response to a target light panel replacing one of the plurality of light panels, forward voltage values of the target light panel and the at least one reference light panel become consistent, wherein the storage circuit of each light panel further is configured to store position information of each light panel.

4. A display device, comprising:

a plurality of light panels, wherein each light panel comprises:

a plurality of light-emitting diodes;

a driving circuit, configured to drive the plurality light-emitting diodes and detect a forward voltage value of at least one light-emitting diode of the plurality light-emitting diodes as a forward voltage value corresponding to the light panel; and a storage circuit, configured to store the forward voltage value of the at least one light-emitting diode;

a control circuit, electrically coupled to the plurality of light panels, wherein the plurality of light panels comprises at least one reference light panel, wherein in response to a target light panel replacing one of the plurality of light panels, forward voltage values of the target light panel and the at least one reference light panel become consistent, the display device; and a plurality of hub boards, respectively electrically coupled to the control circuit and corresponding light panels, and configured to provide position information of the plurality of light panels to the control circuit.

5. The display device according to claim 1, wherein the at least one reference light panel is a light panel adjacent to the target light panel.

6. A brightness adjustment method of a display device, wherein the display device comprises a plurality of light panels, each light panel comprises a plurality of light-emitting diodes, and the brightness adjustment method comprises:

detecting a forward voltage value of at least one light-emitting diode of at least one reference light panel among the plurality of light panels as a forward voltage value of the at least one reference light panel;

detecting a forward voltage value of at least one light-emitting diode in a target light panel as a forward voltage value of the target light panel;

allowing forward voltage values of the target light panel and the at least one reference light panel to become consistent in response to the target light panel replacing one of the plurality of light panels;

adjusting a driving current of the target light panel according to the forward voltage value of the target light panel and the forward voltage value of the at least one reference light panel, so that forward voltage values of the target light panel and the at least one reference light panel become consistent; and adjusting the driving current of the target light panel according to an average of forward voltage values of a plurality of reference light panels surrounding the target light panel.

7. A brightness adjustment method of a display device, wherein the display device comprises a plurality of light panels, each light panel comprises a plurality of light-emitting diodes, and the brightness adjustment method comprises:

detecting a forward voltage value of at least one light-emitting diode of at least one reference light panel among the plurality of light panels as a forward voltage value of the at least one reference light panel;

detecting a forward voltage value of at least one light-emitting diode in a target light panel as a forward voltage value of the target light panel;

allowing forward voltage values of the target light panel and the at least one reference light panel to become consistent in response to the target light panel replacing one of the plurality of light panels;

adjusting a driving current of the target light panel according to the forward voltage value of the target light panel and the forward voltage value of the at least one reference light panel, so that forward voltage values of the target light panel and the at least one reference light panel become consistent;

calculating to obtain a brightness value difference of the at least one reference light according to an initial forward voltage value of the at least one reference light panel, a current forward voltage value, and a ratio of a forward voltage value difference and a brightness value difference corresponding to a duration of usage of the at least one reference light panel;

calculating to obtain a current brightness value of the at least one reference light panel according to a brightness value difference of the at least one reference light panel and an initial brightness value of the at least one reference light panel; and adjusting the driving current of the target light panel according to a current brightness value of the at least one reference light panel.

8. The brightness adjustment method of a display device according to claim 7, comprising:

performing an interpolation calculation according to forward voltage value differences corresponding to different durations of usage of the at least one reference light panel, and performing an interpolation calculation according to a brightness value difference corresponding to different durations of usage of the at least one reference light panel to obtain a ratio of a forward voltage value difference value and a brightness value difference corresponding to a current duration of usage of the at least one reference light panel.

9. The brightness adjustment method of a display device according to claim 6, wherein the at least one reference light panel is a light panel adjacent to the target light panel.

* * * * *